(12) United States Patent
Cheng

(10) Patent No.: US 9,208,074 B2
(45) Date of Patent: Dec. 8, 2015

(54) UPDATING ADDRESS MAPPING IN SUB-INTERVALS IN A FLASH MEMORY DATA STORAGE DEVICE

(71) Applicant: Silicon Motion, Inc., Jhubei, Hsinchu County (TW)

(72) Inventor: Chang-Kai Cheng, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 211 days.

(21) Appl. No.: 14/014,941

(22) Filed: Aug. 30, 2013

(65) Prior Publication Data

US 2015/0067233 A1    Mar. 5, 2015

(51) Int. Cl.
*G06F 12/02* (2006.01)
*G06F 12/10* (2006.01)

(52) U.S. Cl.
CPC ........ *G06F 12/0246* (2013.01); *G06F 12/0292* (2013.01); *G06F 12/1009* (2013.01); *G06F 2212/7201* (2013.01)

(58) Field of Classification Search
CPC ............ G06F 12/0246; G06F 12/0292; G06F 12/1009; G06F 2212/7201
See application file for complete search history.

(56) References Cited

U.S. PATENT DOCUMENTS

| 8,180,953 | B2 | 5/2012 | Chu | |
| 8,214,578 | B2 | 7/2012 | Chu et al. | |
| 2009/0150597 | A1 | 6/2009 | Yang et al. | |
| 2009/0248961 | A1 | 10/2009 | Chu et al. | |
| 2010/0211820 | A1* | 8/2010 | Kim et al. | 714/5 |
| 2012/0239869 | A1* | 9/2012 | Chiueh et al. | 711/103 |
| 2013/0103893 | A1* | 4/2013 | Lee et al. | 711/103 |
| 2014/0052898 | A1* | 2/2014 | Nan | 711/103 |

FOREIGN PATENT DOCUMENTS

| TW | 201027420 | 7/2010 |
| TW | 201035757 | 10/2010 |

* cited by examiner

*Primary Examiner* — Hal Schnee
(74) *Attorney, Agent, or Firm* — McClure, Qualey & Rodack, LLP

(57) ABSTRACT

A mapping table H2F update technique for a FLASH memory is disclosed. In the disclosed data storage device, when a master buffer block selected from a plurality of blocks of a FLASH memory to buffer write data from a host is full, the controller updates a logical-to-physical address mapping table for the master buffer block in separated update sub-intervals. Between the separated update sub-intervals, the controller responds to commands from the host. In this manner, commands from the host are responded to in a timely manner, without being postponed by a time-consuming mapping-table update of an entire buffer block.

8 Claims, 6 Drawing Sheets

UPDATING ADDRESS MAPPING IN SUB-INTERVALS IN A FLASH MEMORY DATA STORAGE DEVICE

BACKGROUND OF THE INVENTION

1. Field of the Invention

The present invention relates to data storage devices, and in particular to FLASH memory control methods.

2. Description of the Related Art

A Flash memory is a general non-volatile storage device that is electrically erased and programmed A NAND Flash, for example, is primarily used in memory cards, USB flash devices, solid-state drives, eMMCs (embedded MultiMediaCards), and so on.

A FLASH memory may be coupled to a host as a data storage medium. Therefore, a logical-to-physical address mapping table between the host and the FLASH memory is required. The maintenance of the logical-to-physical address mapping table is an important issue.

BRIEF SUMMARY OF THE INVENTION

A data storage device and a FLASH memory control method thereof are disclosed.

A data storage device in accordance with an exemplary embodiment of the disclosure comprises a FLASH memory and a controller. The FLASH memory provides storage space which is divided into a plurality of blocks. Each block comprises a plurality of pages. The controller operates the FLASH memory in accordance with commands issued from a host. When a master buffer block selected from the plurality of blocks of the FLASH memory to buffer write data from the host is full, the controller updates a logical-to-physical address mapping table for the master buffer block in separated update sub-intervals. Between the separated update sub-intervals, the controller responds to commands from the host. In this manner, commands from the host are responded to in a timely manner, without being postponed by a time-consuming mapping-table update of the entire buffer block.

In another exemplary embodiment of the disclosure, a FLASH memory control method is shown, which comprises the following steps: using a FLASH memory to provide storage space which is divided into a plurality of blocks, wherein each block comprises a plurality of pages; operating the FLASH memory in accordance with commands issued from a host; and, when a master buffer block selected from the plurality of blocks of the FLASH memory to buffer write data from the host is full, updating a logical-to-physical address mapping table for the master buffer block in separated update sub-intervals. Between the separated update sub-intervals, commands from the host are responded to. In this manner, commands from the host are responded to in a timely manner, without being postponed by a time-consuming mapping-table update of the entire buffer block.

In an exemplary embodiment of the disclosure, a slave buffer block is further selected from the plurality of blocks of the FLASH memory to buffer write data that the host issues between the separated update sub-intervals. In this manner, write commands from the host are responded to in a timely manner, without being postponed by a time-consuming mapping-table update of the entire master buffer block.

In an exemplary embodiment of the disclosure, the logical-to-physical address mapping relationship of the entire master buffer block is updated segment by segment during the separated update sub-intervals.

In another exemplary embodiment of the disclosure, the logical-to-physical address mapping relationship of the entire master buffer block is updated group by group (grouped by the logical addresses) during the separated update sub-intervals.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments of carrying out the invention. This description is made for the purpose of illustrating the general principles of the invention and should not be taken in a limiting sense. The scope of the invention is best determined by reference to the appended claims.

For a FLASH memory operated according to commands issued from a host, a logical-to-physical address mapping table between the host and FLASH memory is required. The logical-to-physical address mapping table should be updated onto the FLASH memory for non-volatile storage.

Figure 1:
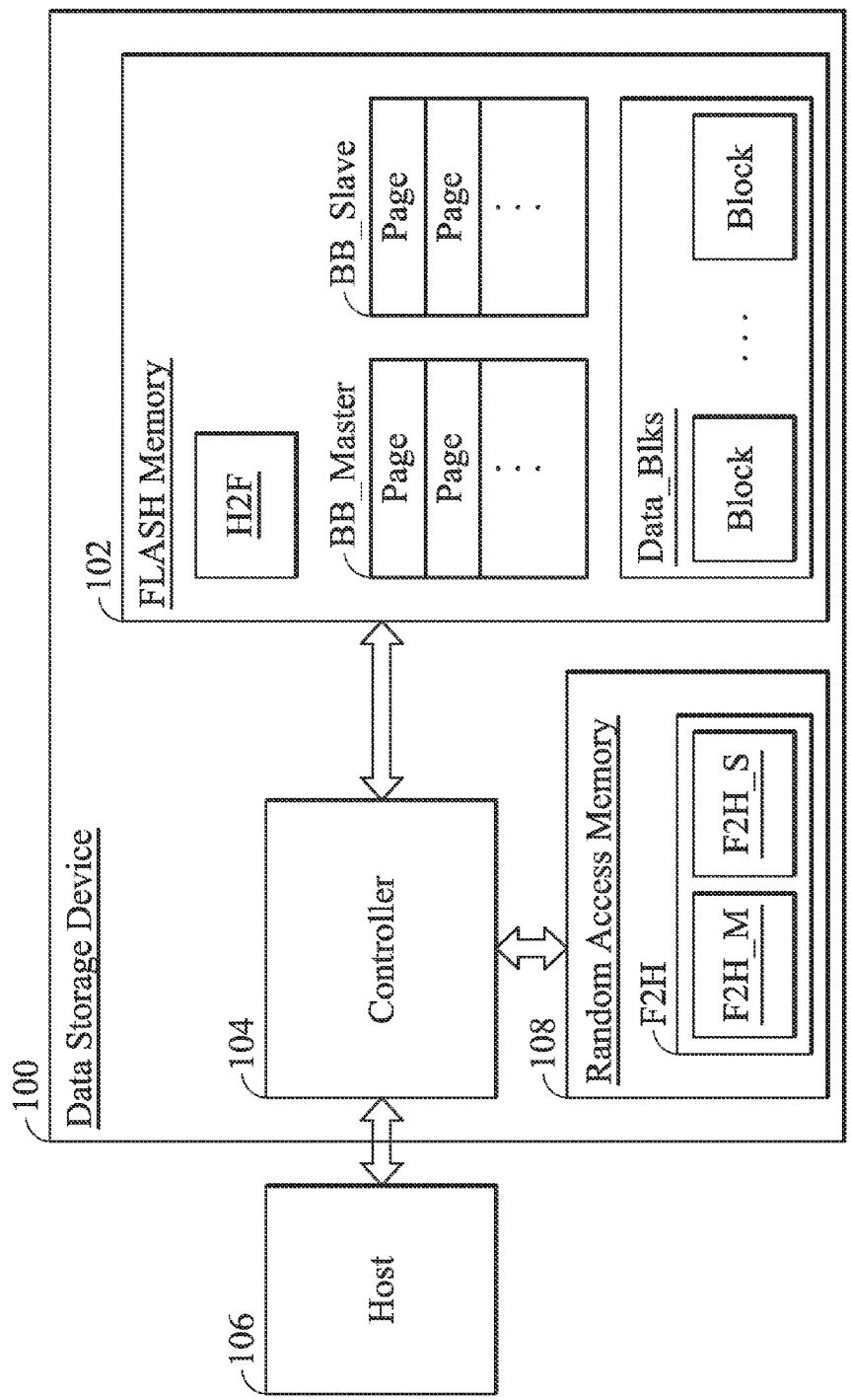
FIG. 1 is a block diagram depicting a data storage device 100 in accordance with an exemplary embodiment of the disclosure.

FIG. 1 is a block diagram depicting a data storage device 100 in accordance with an exemplary embodiment of the disclosure. The data storage device 100 comprises a FLASH memory 102 and a controller 104. The controller 104 operates the FLASH memory 102 in accordance with commands issued from a host 106. The FLASH memory 102 provides storage space which is divided into a plurality of blocks. Each block comprises a plurality of pages. An erase operation has to be performed on an entire block. The entire space of a block has to be released together.

According to an exemplary embodiment of the disclosure, two blocks are allocated as a master buffer block BB_Master and a slave buffer block BB_Slave, respectively. Via the controller 104, write data issued from the host 106 is buffered by the master buffer block BB_Master when the master buffer block BB_Master is not full. When the master buffer block BB_Master is full, the controller 104 updates a logical-to-physical address mapping table H2F for the master buffer block BB_Master in separated update sub-intervals. Between the separated update sub-intervals, the controller 104 responds to commands issued from the host 106. In this manner, commands from the host 106 are responded to in a timely manner, without being postponed by a time-consuming mapping-table update of an entire buffer block.

In the exemplary embodiment shown in FIG. 1, between the separated update sub-intervals, the controller 104 uses the slave buffer block BB_Slave to buffer write data issued from the host 106. In this manner, write commands from the host 106 are responded to in a timely manner, without being postponed by a time-consuming mapping-table update of the entire master buffer block BB_Master.

In FIG. 1, the data storage device 100 further comprises a random access memory 108 in which a physical-to-logical address mapping table F2H between the FLASH memory 102 and the host 106 is updated in real-time. The logical-to-physical address mapping table H2F is updated based on the real-time mapping information maintained on the random access memory 108 in the physical-to-logical address mapping table F2H. As shown, the physical-to-logical address mapping relationship of the master buffer block BB_Master is dynamically updated in the random access memory 108 as the table F2H_M, and, the physical-to-logical address mapping relationship of the slave buffer block BB_Slave is dynamically updated in the random access memory 108 as the table F2H_S. When the master buffer block BB_Master is full, the logical-to-physical address mapping table H2F is updated based on the real-time information in the table F2H_M. As for the write operations issued between the separated update sub-intervals of the master buffer block BB_Master, the physical-to-logical address mapping table F2H_S is dynamically modified in accordance with the write data buffered in the slave buffer block BB_Slave. After finishing the separated update sub-intervals for the master buffer block BB_Master, the controller 104 may push the master buffer block BB_Master into the data blocks Data_Blks of the FLASH memory 102 and change the slave buffer block BB_Slave to play the role of the master buffer block and select a spare block to play the role of the slave buffer block.

Figure 2:
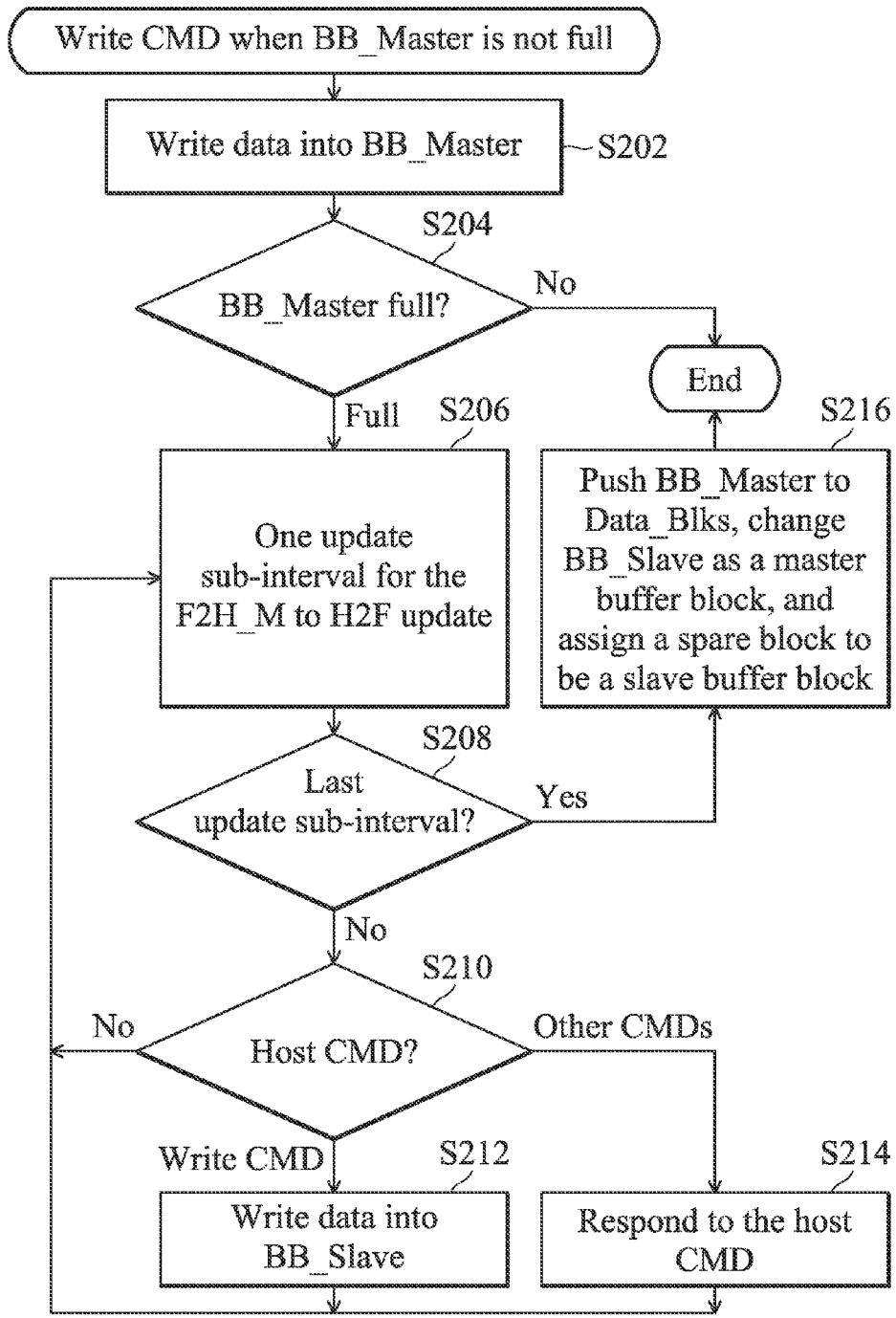
FIG. 2 shows a flowchart, depicting the logical-to-physical address mapping-table update procedure in accordance with an exemplary embodiment of the disclosure.

FIG. 2 shows a flowchart, depicting the logical-to-physical address mapping-table update procedure in accordance with an exemplary embodiment of the disclosure, which is discussed with respect to the elements shown in FIG. 1.

When the master buffer block BB_Master is not full and the host 106 issues a write command, step S202 is performed to write data into the master buffer block BB_Master. In step S204, it is checked whether the master buffer block BB_Master is filled full after step S202. When it is determined in step S204 that the master buffer block BB_Master is full, it is time to start updating the logical-to-physical address mapping table H2F for the master buffer block BB_Master. Note that the logical-to-physical address mapping table H2F for the master buffer block BB_Master is updated in separated update sub-intervals based on the real-time physical-to-logical address mapping information provided by the table F2H_M. Step S206 is performed for one update sub-interval and it is determined in step S208 whether the last update sub-interval has been performed. When the last update sub-interval has not yet been performed, it is checked in step S210 whether the host 106 is issuing any commands. When the host 106 is silent, step S206 is performed again for another update sub-interval. When the host 106 issues another write command, step S212 is performed to write data into the slave buffer block BB_Slave. Even when the commands issued by the host 106 are not write commands, step S214 is performed and the controller 104 responds to the host commands. The next update sub-interval is arranged after steps S212 and S214, executed by repeating step S206. In this manner, commands from the host 106 are responded to in a timely manner, without being postponed by a time-consuming mapping-table update of the entire master buffer block BB_Master.

Note that, when it is determined in step S208 that all the update sub-intervals for the master buffer block BB_Master have been performed, step S216 is performed to push the master buffer block BB_Master into the data blocks Data_Blks, change the slave buffer block BB_Slave as the substituent of the master buffer block and select a spare block as the substituent of the slave buffer block. The master and slave buffer block design makes the operation of the FLASH memory 102 more fluent.

Figure 3:
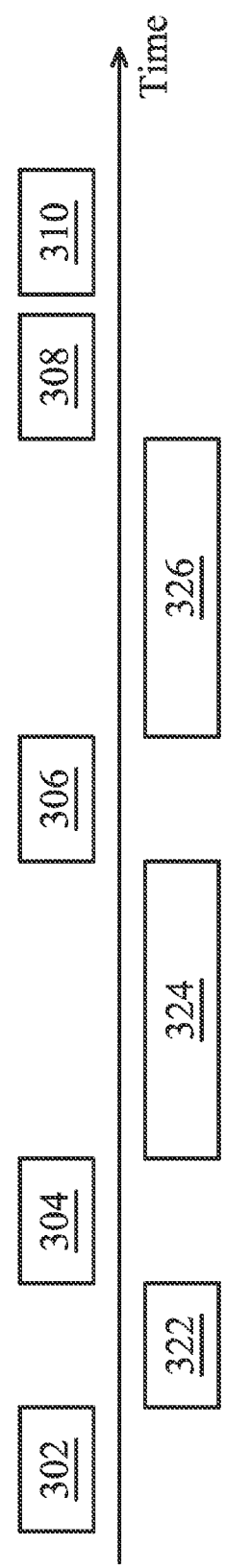
FIG. 3 is a timing diagram, showing that the logical-to-physical address mapping relationship of an entire buffer block is updated in separated update sub-intervals 302, 304, 306, 308 and 310.

FIG. 3 is a timing diagram, showing that the logical-to-physical address mapping relationship of a master buffer block BB_Master is updated in separated update sub-intervals 302, 304, 306, 308 and 310. Note that the host commands are responded to in the time intervals 322, 324 and 326 between the separated update sub-intervals 302, 304, 306, 308 and 310 rather than being postponed until a complete mapping-table update of the entire buffer block BB_Master.

The amount of update data during each update sub-interval depends on the user's requirements.

Figure 4:
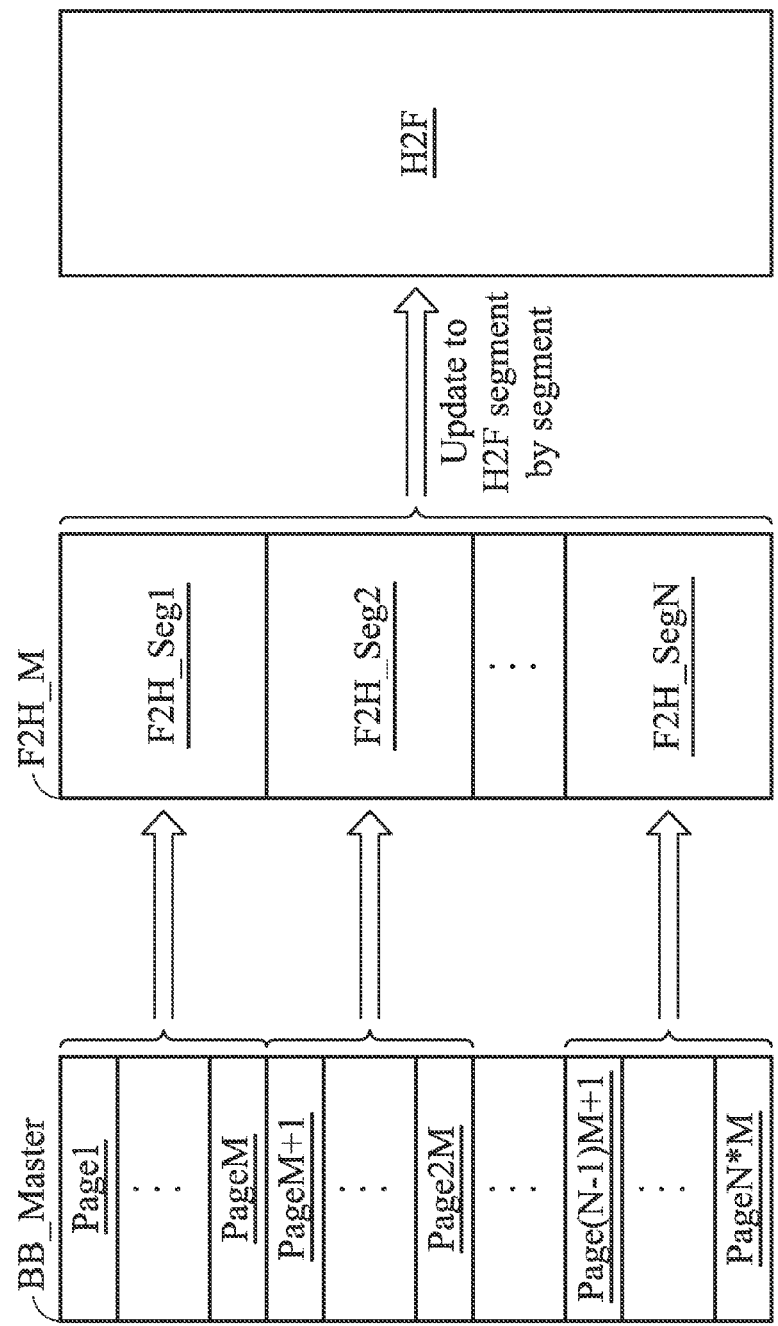
FIG. 4 shows that the logical-to-physical address mapping relationship of an entire buffer block is updated segment by segment.

FIG. 4 depicts that the logical-to-physical address mapping relationship of the entire master buffer block BB_Master is updated segment by segment. The whole master buffer block BB_Master is divided into segments. Each segment comprises M successive physical pages. M is a number. For the different segments, the real-time physical-to-logical address mapping information is recorded as tables F2H_Seg1, F2H_Seg2 . . . F2H_SegN in the table F2H_M maintained in the random access memory 108. The logical-to-physical address mapping table H2F is updated in separated update sub-intervals based on the tables F2H_Seg1, F2H_Seg2 . . . F2H_SegN, respectively. Between the update sub-intervals, host commands are responded to. For example, when the table H2F has been updated based on the table F2H_Seg1 but not updated based the table F2H_seg2 yet, it is allowed to respond to host commands issued in this time period.

In another exemplary embodiment of the disclosure, the logical-to-physical address mapping relationship of the entire master buffer block BB_Master is updated group by group (grouped by the logical addresses) during the separated update sub-intervals.

Figure 5A:
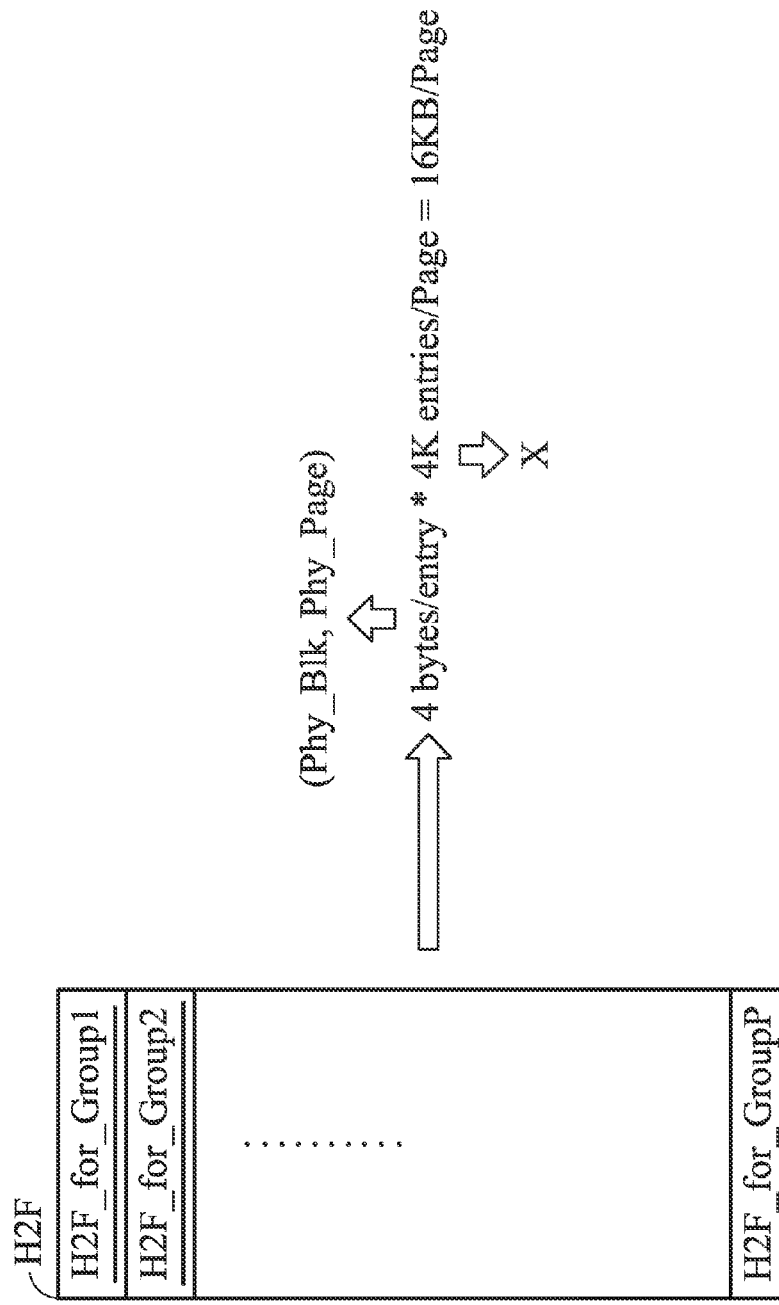
FIG. 5A shows a logical-to-physical address mapping table H2F recorded in a FLASH memory in accordance with an exemplary embodiment of the disclosure, wherein the logical-to-physical address mapping table H2F is stored in a plurality of pages H2F_for_Group1, H2F_for_Group2 and so on, and, each page (e.g., H2F_for_Group1 or H2F_for_Group2) corresponds to one group of logical addresses.

FIG. 5A shows a logical-to-physical address mapping table H2F recorded in a FLASH memory in accordance with an exemplary embodiment of the disclosure, which shows how the different logical addresses are divided into groups. The logical-to-physical address mapping table H2F is stored in a plurality of pages H2F_for_Group1, H2F_for_Group2 up to H2F_for_GroupP. Each page of the logical-to-physical address mapping table H2F is divided into X entries for storage of the physical address information of X logical addresses. X is a number. Referring to the exemplary embodiment of FIG. 5A, the logical-to-physical address mapping information about each logical address is 4 bytes long, including a physical block number Phy_Blk and a physical page number Phy_Page. In this exemplary embodiment, the number X is 4K because the page size is 16 KB, 16 KB/4 B=4K. The different 4K logical addresses, sharing one page for recording the logical-to-physical address mapping information thereof, are classified as belonging to one group and may be consecutive logical addresses. Page H2F_for_Group1 is stored with the physical address information of 4K different logical addresses, wherein the 4K different logical addresses are classified as belonging to a $1^{st}$ group. Page H2F_for_Group2 is stored with the physical address information of 4K different logical addresses, wherein the 4K different logical addresses are classified as belonging to a $2^{nd}$ group. Similarly, as for the page H2F_for_GroupP, it is stored with the physical address information of 4K different logical addresses, wherein the 4K different logical addresses are classified as belonging to a $P^{th}$ group.

Figure 5B:
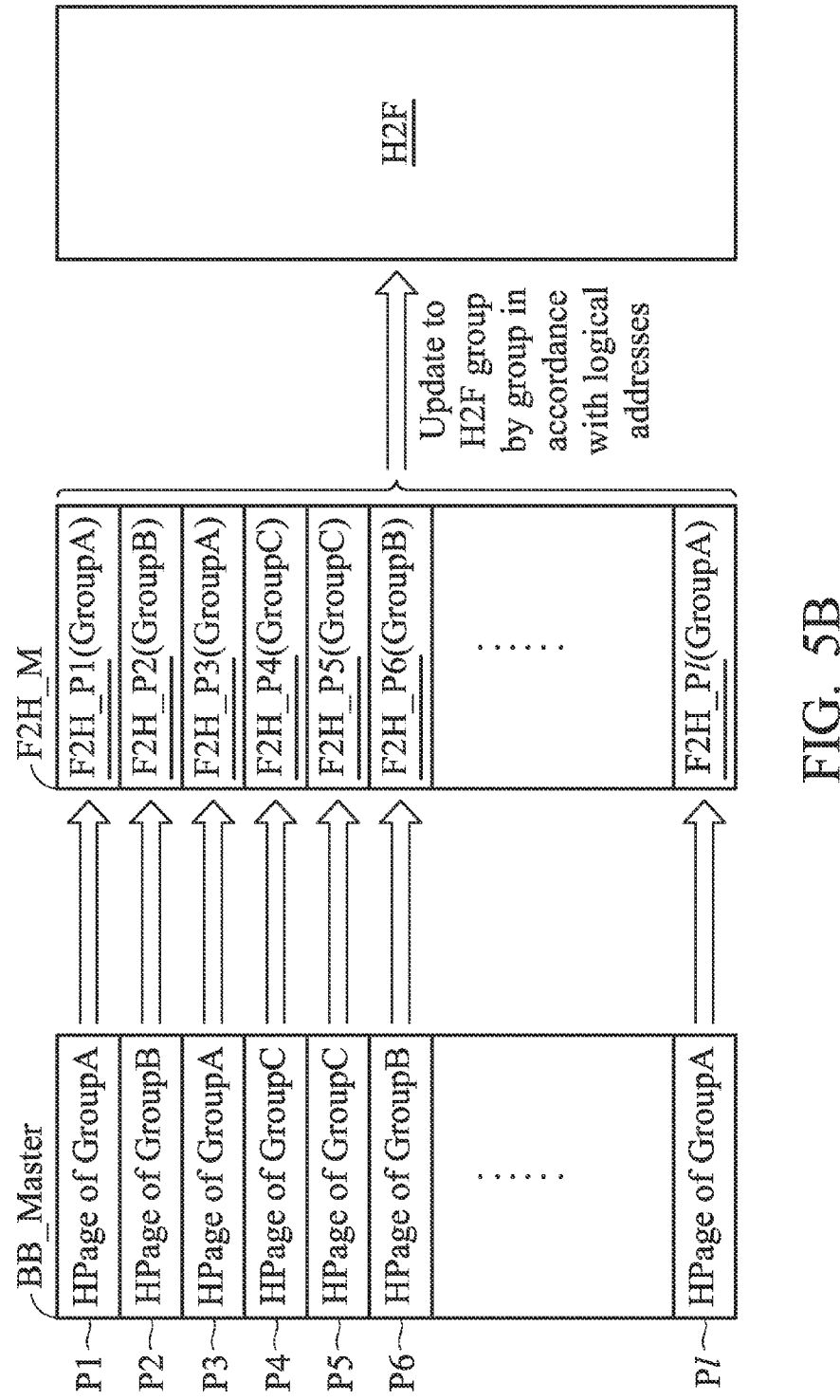
FIG. 5B shows that the logical-to-physical address mapping relationship of an entire buffer block is updated group by group.

FIG. 5B depicts that the logical-to-physical address mapping relationship of the entire master buffer block BB_Master is updated group by group according to the logical addresses. In this exemplary embodiment, pages P1, P3 and Pl are stored with page data having logical addresses belonging to a group GroupA, pages P2 and P6 are stored with page data having logical addresses belonging to another group GroupB, and, pages P4 and P5 are stored with page data having logical addresses belonging to another group GroupC. For the different physical pages P1 to Pl, the real-time physical-to-logical address mapping information is recorded as tables F2H_P1 . . . F2H_Pl in the table F2H_M and maintained in the random access memory 108. Accordingly, the tables F2H_P1, F2H_P3 and F2H_Pl correspond to the group GroupA, the tables F2H_P2 and F2H_P6 correspond to the group GroupB, and, the tables F2H_P4 and F2H_P5 correspond to the group GroupC. The logical-to-physical address mapping table H2F is updated in separated update sub-intervals. In the first update sub-interval, the table H2F is updated based on the tables F2H_P1, F2H_P3 and F2H_Pl corresponding to the group GroupA. In the second update sub-interval, the table H2F is updated based on the tables F2H_P2 and F2H_P6 corresponding to the group GroupB. In the third update sub-interval, the table H2F is updated based on the tables F2H_P4 and F2H_P5 corresponding to the group GroupC. Between the updates for the different groups, it is allowed to respond to host commands. Note that in other exemplary embodiments the logical-to-physical address mapping relationship of more than one group is updated during each update sub-interval.

In other exemplary embodiments, the controller 104 may include a computing unit and a read-only memory (ROM) stored with a ROM code. The ROM code may be coded according to the disclosure to be executed by the computing unit. The disclosed table H2F update techniques, therefore, may be implemented by firmware. Further, any control method for a FLASH memory involving the disclosed table H2F update techniques is also in the scope of the disclosure.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
  a FLASH memory, providing storage space divided into a plurality of blocks with each block comprising a plurality of pages;
  a random access memory; and
  a controller, operating the FLASH memory in accordance with commands issued from a host,
  wherein:
  when a master buffer block selected from the plurality of blocks of the FLASH memory to buffer write data from the host is full, the controller updates a logical-to-physical address mapping table for the master buffer block based on a master buffer block physical-to-logical address mapping table in separated update sub-intervals;
  the logical-to-physical address mapping table is maintained on the FLASH memory;
  the master buffer block physical-to-logical address mapping table is maintained in the random access memory corresponding to the master buffer block;
  between the separated update sub-intervals, the controller responds to commands from the host; and
  the controller further selects a slave buffer block from the plurality of blocks of the FLASH memory to buffer write data between the separated update sub-intervals.

2. The data storage device as claimed in claim 1, wherein:
  in one update sub-interval, the controller updates the logical-to-physical address mapping relationship of M successive physical pages of the master buffer block, where M is a number.

3. The data storage device as claimed in claim 1, wherein:
  in one update sub-interval, the controller updates the logical-to-physical address mapping relationship of P groups of logical addresses;
  P is a number; and
  the logical addresses belonging to the same group share the same physical page for storage of the logical-to-physical address mapping relationship.

4. The data storage device as claimed in claim 1, wherein:
  after finishing the separated update sub-intervals for the master buffer block, the controller pushes the master buffer block into data blocks of the FLASH memory and uses the slave buffer block to play the role of the master buffer block and selects a spare block from the blocks of the FLASH memory to play the role of the slave buffer block.

5. A FLASH memory control method, comprising:
  using a FLASH memory to provide storage space which is divided into a plurality of blocks, wherein each block comprises a plurality of pages;
  operating the FLASH memory in accordance with commands issued from a host; and
  when a master buffer block selected from the plurality of blocks of the FLASH memory to buffer write data from the host is full, updating a logical-to-physical address mapping table for the master buffer block based on a master buffer block physical-to-logical address mapping table in separated update sub-intervals,
  wherein:
  the logical-to-physical address mapping table is maintained on the FLASH memory;
  the master buffer block physical-to-logical address mapping table is maintained in a random access memory corresponding to the master buffer block;
  between the separated update sub-intervals, commands from the host are responded to; and
  a slave buffer block is selected from the plurality of blocks of the FLASH memory to buffer write data between the separated update sub-intervals.

6. The FLASH memory control method as claimed in claim 5, wherein:
  in one update sub-interval, the logical-to-physical address mapping relationship of M successive physical pages of the master buffer block is updated; and
  M is a number.

7. The FLASH memory control method as claimed in claim 5, wherein:

in one update sub-interval, the logical-to-physical address mapping relationship of P groups of logical addresses is updated;

P is a number; and the logical addresses belonging to the same group share the same physical page for storage of the logical-to-physical address mapping relationship.

8. The FLASH memory control method as claimed in claim 5, wherein:

after finishing the separated update sub-intervals for the master buffer block, the master buffer block is pushed into data blocks of the FLASH memory, the slave buffer block is changed to play the role of the master buffer block, and a spare block is selected from the blocks of the FLASH memory to play the role of the slave buffer block.

\* \* \* \* \*